E. B. PAYNE.
LOCK NUT.
APPLICATION FILED OCT. 16, 1914.

1,134,902.

Patented Apr. 6, 1915.

Witnesses
Frederick L. Fox.

Inventor
E. B. Payne.
By Victor J. Evans.
Attorney

UNITED STATES PATENT OFFICE.

EVALENA B. PAYNE, OF UNION LEVEL, VIRGINIA.

LOCK-NUT.

1,134,902.  Specification of Letters Patent.  Patented Apr. 6, 1915.

Application filed October 16, 1914. Serial No. 866,968.

*To all whom it may concern:*

Be it known that I, EVALENA B. PAYNE, a citizen of the United States, residing at Union Level, in the county of Mecklenburg and State of Virginia, have invented new and useful Improvements in Lock-Nuts, of which the following is a specification.

The present invention relates to improvements in means for locking a bolt upon a nut.

The improvement is primarily directed to axle splindles and lock nuts therefor, and the object is to provide a lock nut for the spindle which shall comprise two hinged members, the inner spindle engaging member being provided with a threaded bore, the outer or locking member being formed with a lug which is adapted to be received within a groove in the end of the spindle, and means being provided for locking the outer hinged member to the inner nut engaging member.

Another object of the invention is to simplify and improve the existing art by providing a lock nut of a simple construction which shall be cheap to manufacture, which may be easily and quickly applied and which will perform the functions for which it is intended with accuracy and with surety.

With the above and other objects in view, the improvement resides in the construction, combination and arrangement of parts set forth in the following specification and falling within the scope of the appended claim.

Figure 1:
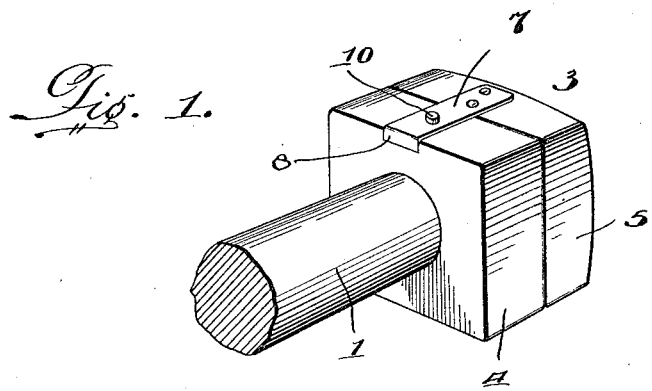
Figure 2:
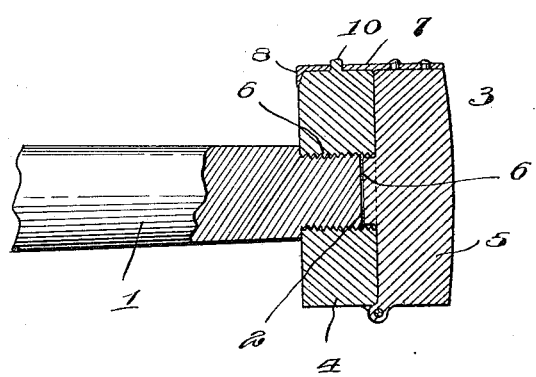
Figure 3:
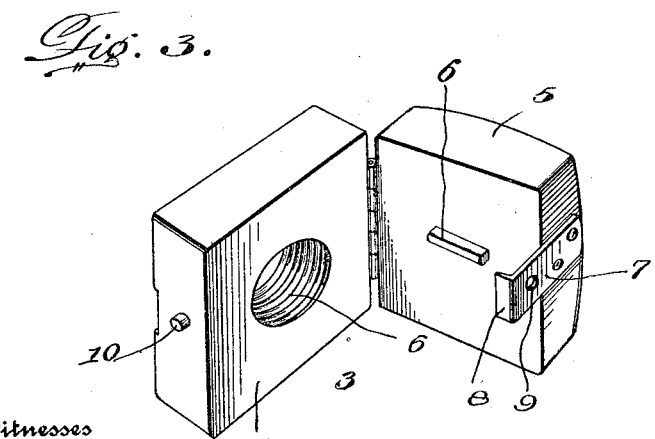
Figure 4:
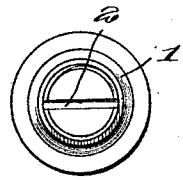

In the drawing: Figure 1 is a perspective view illustrating my improved lock nut locking a bolt or spindle in accordance with the present invention, Fig. 2 is a central longitudinal sectional view through the same, Fig. 3 is a perspective view showing the hinged outer section of the nut swung away from the inner or bolt engaging member, and Fig. 4 is a detail elevation looking toward the end of the bolt or spindle.

While in the accompanying drawing I have illustrated the device in connection with an axle spindle, it is to be understood that the same is not to be thus restricted in its useful capacity, as the same may be applied with equal success upon an ordinary bolt.

Referring to the drawings in detail, the numeral 1 designates a spindle having its reduced threaded end provided with a transverse slot or groove 2.

The lock nut is broadly designated by the numeral 3. The lock nut comprises two members, indicated by the numerals 4 and 5 respectively, and the inner member 4 has a threaded bore 6 which engages with the threaded end of the spindle. The outer member is centrally formed with an inwardly extending lug or tongue 6 which is adapted to be received within the slot or groove 2 of the spindle when the said outer section is swung upon the inner section of the lock nut.

The numeral 7 designates a strap which is arranged upon the face of the outer member 5 diametrically opposite its hinged connection with the inner member 4, and this strap may be in the nature of a metal spring which may have its inner end provided with a detent 8 to engage within a suitable recess upon the inner face of the section 4, or to engage with the said inner face of said section 4. The strap is further provided with an opening 9 to receive the lug 10 provided upon the inner nut section 4.

It should be stated that the threaded end of the spindle 2 may be provided with a plurality of intersecting slots or grooves, and the lug or tongue 6 may engage in any of said slots or grooves.

From the above description, taken in connection with the accompanying drawing, the simplicity of the device, as well as the advantages thereof will, it is thought, be perfectly apparent to those skilled in the art to which such invention appertains without further detailed description.

Having thus described the invention, what I claim is:

The combination with a spindle having its threaded end provided with slots or grooves, of a lock nut, said lock nut comprising an inner member having a threaded bore which engages with the threaded end of the spindle, and an outer member which is hingedly connected with the inner member, the said outer member having a projecting lug or tongue which is adapted to be received within the bore of the inner member and engaged between the walls of the slots of the groove of the spindle, a strap upon the outer member, said strap having a detent engaging with one of the faces of the inner member, said strap being further provided with an opening, and the inner member being formed with a lug which extends within the opening of the strap when the outer member is swung upon and locked to the inner member of the lock nut.

In testimony whereof I affix my signature in presence of two witnesses.

EVALENA B. PAYNE.

Witnesses:
GLADSTONE PAYNE,
G. R. THOMPSON.

Copies of this patent may be obtained for five cents each, by addressing the "Commissioner of Patents, Washington, D. C."